United States Patent [19]

Reneau

[11] Patent Number: 5,678,722
[45] Date of Patent: Oct. 21, 1997

[54] PRESSURE CHAMBER

[76] Inventor: Raymond Paul Reneau, 701 N. St. Marys, San Antonio, Tex. 78205

[21] Appl. No.: 616,262

[22] Filed: Mar. 15, 1996

[51] Int. Cl.⁶ .................................................. B65D 45/28
[52] U.S. Cl. ........................ 220/323; 220/324; 220/325
[58] Field of Search ................................ 220/315, 319, 220/324, 325, 327, 323

[56] References Cited

U.S. PATENT DOCUMENTS

| | | |
|---|---|---|
| D. 52,426 | 9/1918 | Blanchard . |
| D. 88,979 | 1/1933 | Mortrude, Jr. . |
| D. 208,744 | 9/1967 | Waine . |
| D. 258,084 | 1/1981 | Weingarten . |
| D. 346,864 | 5/1994 | Reneau . |
| 997,793 | 7/1911 | Fish et al. . |
| 1,269,572 | 6/1918 | Allenbaugh . |
| 2,010,200 | 8/1935 | Rufener et al. . |
| 2,196,895 | 4/1940 | Bowman . |
| 2,584,100 | 1/1952 | Uecker . |
| 2,664,611 | 1/1954 | Shomber . |
| 3,258,151 | 6/1966 | Gasche . |
| 3,866,794 | 2/1975 | Kerr . |
| 4,102,474 | 7/1978 | Platts . |
| 4,114,933 | 9/1978 | Jankelewitz . |
| 4,307,818 | 12/1981 | Singh et al. ................ 220/323 |
| 4,315,577 | 2/1982 | Bernson, Jr. . |
| 4,342,207 | 8/1982 | Holmes et al. . |
| 4,467,798 | 8/1984 | Saxon et al. . |
| 4,489,850 | 12/1984 | Reneau . |
| 4,512,496 | 4/1985 | Tsou . |
| 4,519,519 | 5/1985 | Meuschke et al. ................ 220/323 |
| 4,625,890 | 12/1986 | Galer . |
| 4,727,870 | 3/1988 | Krasle . |
| 4,817,610 | 4/1989 | Lee . |
| 5,402,775 | 4/1995 | Reneau . |
| 5,433,334 | 7/1995 | Reneau . |

FOREIGN PATENT DOCUMENTS

| | | |
|---|---|---|
| 1506931 | 11/1967 | France . |
| 1681854 | 10/1991 | U.S.S.R. . |
| 1710041 | 2/1992 | U.S.S.R. . |

OTHER PUBLICATIONS

"Hyperbaric Chamber Systems & Management Proteus", by Proteus Hyberbaric Systems, Inc., 1995, pp. P000851–P000874.

"The Reneau Unit—The first single-patient hyperbaric unit designed for safe 'hands-on' access to the patient during treatment", by Reneau, Inc., 1983. (not enclosed).

"Sigma I Monoplace Hyperbaric System", by Perry Baromedical Services, undated. (not enclosed).

"Sechrist Monoplace Hyperbaric Systems", by Sechrist Indusries, Inc., undated.

"Offers Advantages No Other Hyperbaric Unit Can", by Proteus Hyperbaric Systems, Inc., 1983, pp. P000826–P000831.

"Can your hospital afford not to have the Reneau Unit's unique capabilities?", by Reneau, Inc., undated.

*Primary Examiner*—Joseph M. Moy
*Attorney, Agent, or Firm*—Vaden, Eickenroht & Thompson, L.L.P.

[57] ABSTRACT

There is disclosed a hyperbaric chamber in which access may be had to the interior of a pressure vessel in which a patient is received through a door releasably locked to an open end of the vessel to close same.

7 Claims, 4 Drawing Sheets

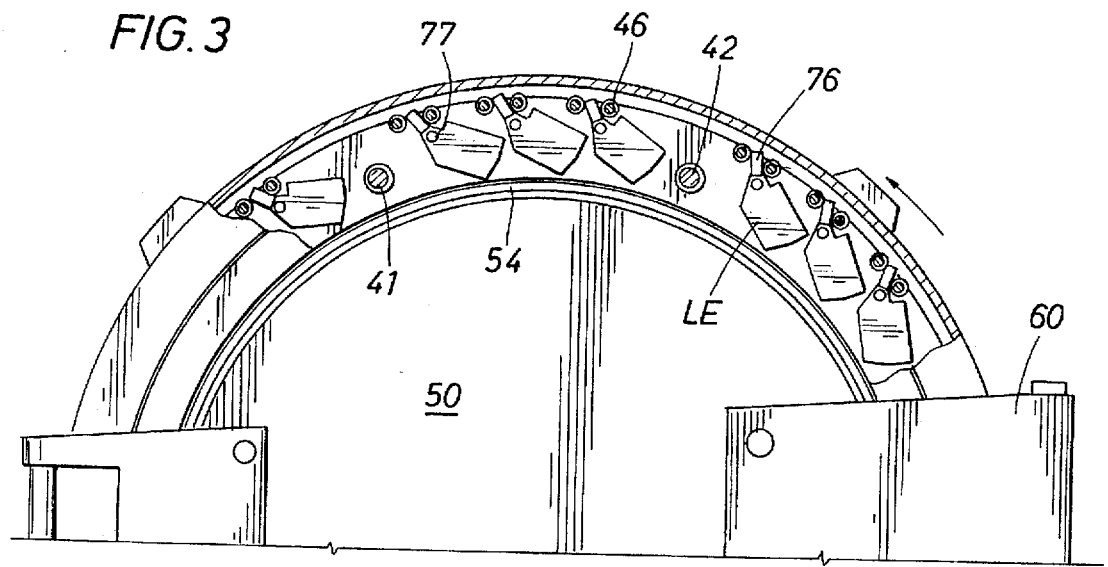
FIG. 3
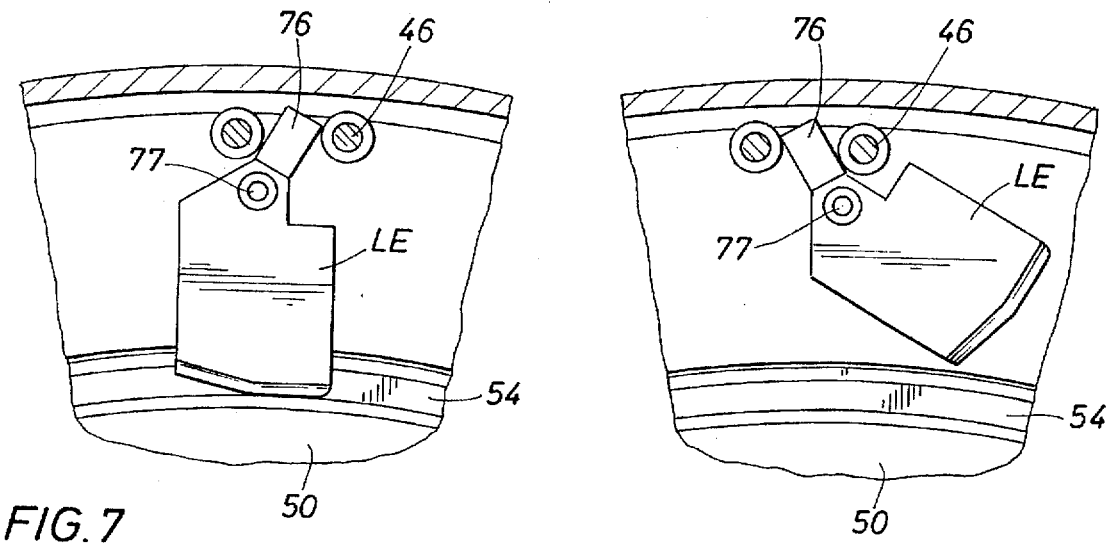
FIG. 7
FIG. 8
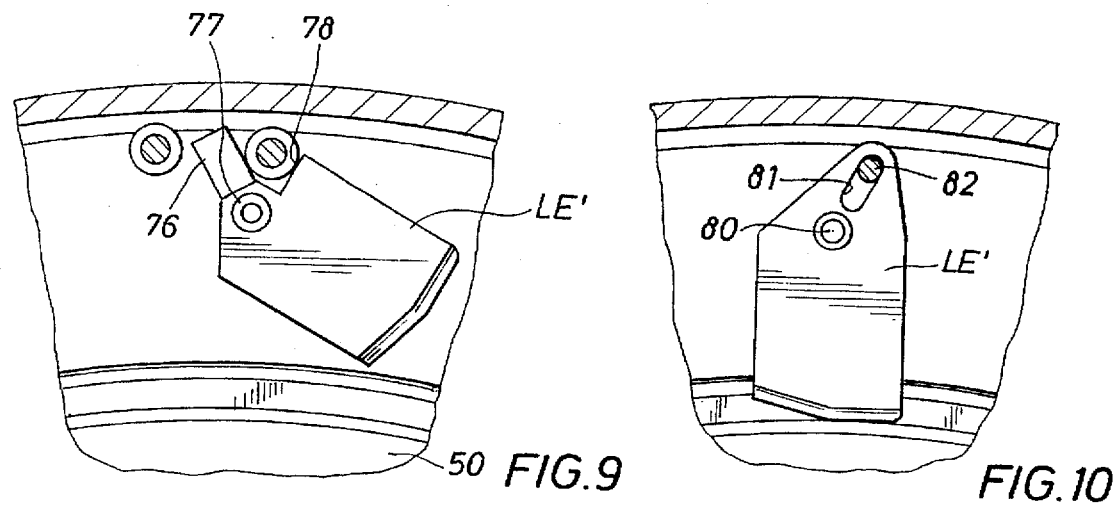
FIG. 9
FIG. 10

PRESSURE CHAMBER

This invention relates generally to a pressure chamber, such as a hyperbaric chamber in which a patient may be treated medically at pressures greater than normal. More particularly, it relates to improvements in such chambers in which access may be had to the interior of a vessel in which the patient is received through a door releasably locked to an opening in the vessel to close same.

As shown for example in U.S. Pat. No. 5,433,334, the vessel may comprise a cylinder and end walls held against its ends of the cylinder, and the door is adapted to be releasably locked to the vessel to close the access opening by means of locking plates mounted on the vessel about the periphery of the opening. Thus, as shown, the locking plates are moved generally radially into and out of locking positions opposite an outwardly facing bearing surface on the door by means of a ring rotatably mounted on the vessel for manipulation from outside of the chamber. When in locking position, the plates are held in locking position by pressure within the vessel. Upon relief of the pressure, the plates may be moved to unlocked position to permit the door to be opened.

The end edges of the plates are confined on opposite sides by end surfaces on the vessel over which they must slide as they are moved guidably into and out of locking position by means of pins on the vessel slidable in slots in the plates. These require very close tolerances between the sliding surfaces which, if not mentioned, may cause the parts to bind and thus interfere with opening and closing of door and/or damage to the parts.

The object of this invention is to provide a chamber of the type above described in which the door is releasably locked in closed position in such a manner as to overcome these and other problems; and, more particularly, in which the door is releasably locked and unlocked by means of locking elements on the vessel which are moved between locking and unlocking positions in such a manner as to eliminate the mechanical problems associated with transferring rotational motion into linear radial movement of locking elements, as well as the need to match the locking element surfaces with the particular size of the opening in the vessel being closed.

This and other objects are accomplished, in accordance with the illustrated embodiments of the invention, by a pressure chamber which comprises a vessel having an opening with an inner surface thereabout, a door having an outer surface adapted to fit within the inner surface of the pressure vessel to close the end opening, and means for releasably locking the door in closed position. The locking means includes locking elements each mounted on the vessel for pivoting between locked position in which an inwardly facing side of each is opposite the bearing surface on the door, and thus held thereagainst by pressure in the vessel, and unlocked position pivoted from opposite said bearing surface so as to permit the door to be installed and/or removed from within the inner surface of the vessel. A ring is rotatably mounted on the vessel adjacent the opening of the vessel for pivoting the locking elements between locked and unlocked positions in response to rotation of the ring in opposite directions, and means are provided for manipulation from the outside of the vessel for so rotating the ring.

The rotating means comprises pins mounted on the vessel and so arranged with respect to oppositely facing surfaces on the locking elements as to swing the locking elements into locked position, as the ring is rotated in one direction, and into unlocked position, as the ring is rotated in the other direction. In certain embodiments of the invention, the pins are arranged in pairs on opposite sides of a locking element so that one pin of at least one pair engages one side of a locking element to swing it into locked position, as the ring is rotated in one direction, and the other pin engages the other side of the locking element to swing it into unlocked position, as the ring is rotated in the other direction.

In one case, the pins of said one pair are tightly engaged with opposite sides of the locking element in each of its locked and unlocked positions to prevent movement of the locking elements therepast. In another case, one side of one pin of said one pair is tightly engaged with one side of the locking element in one of its locked and unlocked positions to prevent movement of the locking elements therepast, and each locking element has a shoulder adjacent its other side which is tightly engaged by the other pin, in the other of its positions, to prevent the locking elements from moving therepast.

In accordance with another embodiment of the invention, each locking element has a slot in which a pin on the actuating ring is received for guidably sliding therein in order to swing the locking element into locked position, as the ring is rotated in one direction, and swing the locking element into unlocked position, as the ring is rotated in the other direction.

In the drawings, wherein like reference characters are used throughout to designate like parts:

FIG. 3 is a partial end view similar to FIG. 2, but with the locking elements moved by the rotatable ring into unlocked position;

FIG. 7 is an enlarged detailed sectional view similar to FIGS. 1 and 2, showing a locking element moved to and held in its locking position by pins on each side thereof;

FIG. 8 is a view similar to FIG. 7, but in which the ring has been rotated in a counter-clockwise direction to cause a pin on one side to swing the locking element to unlocking position;

FIG. 9 is a detailed view of an alternative form of the locking element and pins, with the locking element located in releasing position by a shoulder of the locking element adjacent one side thereof.

Figure 1:
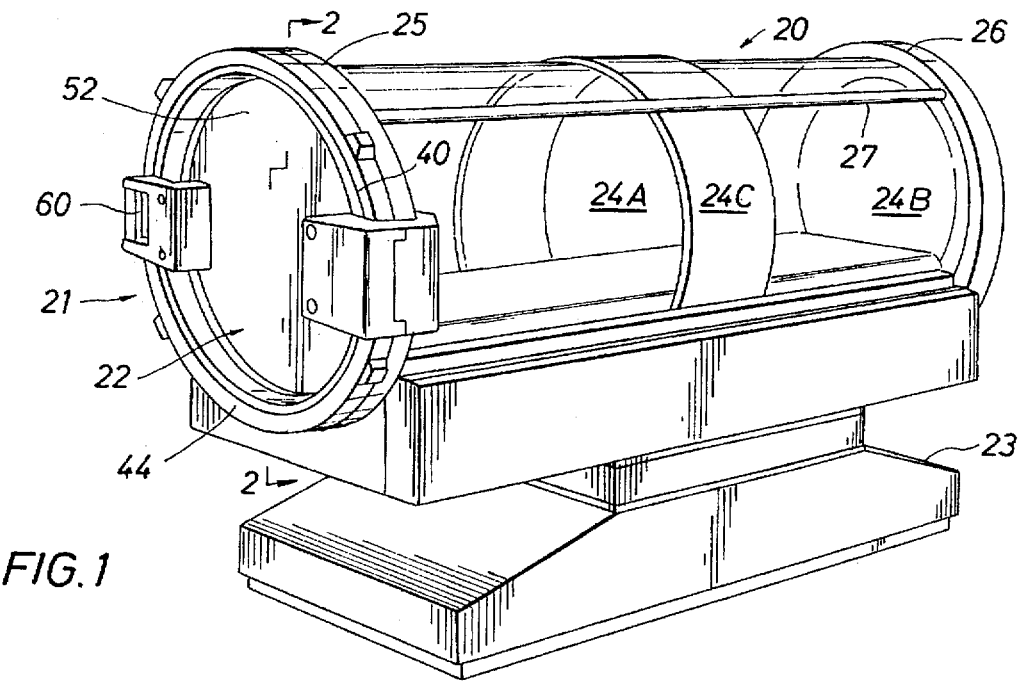
FIG. 1 is a perspective view of a hyperbaric chamber constructed in accordance with a first embodiment of the present invention, and as seen from the left end of the vessel over which a door is locked.
Figure 2:
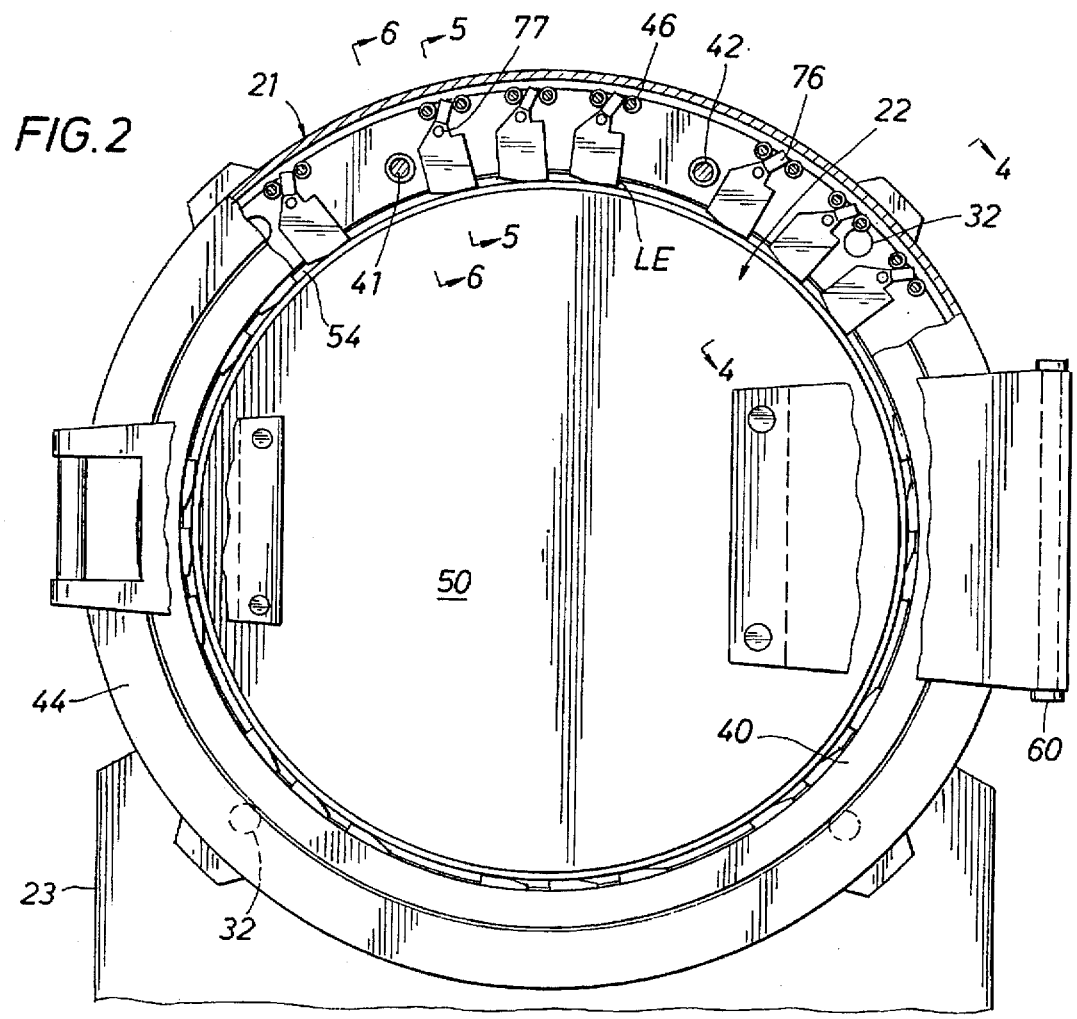
FIG. 2 is an enlarged view of the left end of the vessel of the chamber with a portion thereof broken away to show the locking elements carried by the rotatable ring in locking positions opposite an outwardly facing bearing surface on the body of the door.

FIG. 10 is a detailed view of a locking element constructed in accordance with an other alternative embodiment of the present invention; and With reference now to the details of the above-described drawings, the pressure chamber shown in FIG. 1, and indicated in its entirety by reference character 20, comprises a vessel 21 having an opening in at least its left end which is closed by a door 22. The vessel is mounted on a pedestal 23 and comprises a cylinder having left and right hand cylindrical sections held by a ring, and left and right-hand end walls 25 and 26, respectively, which are held against the ends of the section by means of elongate rods 27 to form a pressure tight environment for a patient when the door is in closed position. To this extent, of course, the construction of the hyperbaric chamber is basically the same as that of the chambers shown in the above-mentioned patent.

The left end wall 25 of the cylinder has a cylindrical access opening 30 therethrough as well as an annular groove 28 on its inner side to receive the left end of cylindrical section 24A. The right-end wall 26 may be imperforate, but nevertheless has a similar groove formed on its inner side to receive the right end of the cylindrical section 24B.

The vessel further comprises an annular body 31 which is held against the outer side of the end wall 25 by means of bolts 41 extending through holes in the wall 25 and body 31 and threaded at their inner ends to sockets formed in the ends of a carrier ring 40 so as to hold the right-end wall against the ends of the rods as well as against the ends of the cylindrical section 24A.

As shown, the wall 25 has a groove formed therein to receive an O-ring 33 which sealably engages the left end of the annular body 31 when the two are brought into engagement with one another. Bolt holes in the body and end wall are aligned with one another by means of an outwardly extending flange 34 on the end wall which fits within a recess in the inner end of the body 31. The body has an opening 35 therethrough to form a continuation of the opening 30 in the end wall 25 as well as a recessed area 36 surrounding the opening 35 to receive a seat comprising a resilient seal ring 38 which has a flexible, outwardly projecting lip on its inner side.

As in the case of the hyperbaric chamber of the prior patent, the door 22 has a body 51 which is mounted on hinges 60 attached to the door and vessel for movement between positions opening and closing the opening 35 in the end wall of the vessel. The outer body of the door has a flange 53 about its inner end and an inner surface held tightly against seal ring 38 about the opening in the vessel in its closed position. The door may have a window therein or a removal cover on which an accessory for the chamber may be mounted.

The carrier ring 40 is connected to the outer end of the body 31 has an opening 43 therein which forms a continuation of the opening 35 through the body 31. The inner side of the seat carrier is held in fixed spaced relation to the outer side of the body 31 by means of spacer rings 42 surrounding the bolts 41, thus providing an annular space in which locking elements LE are received for movement between locking and unlocking positions, as will be described to follow.

Figure 4:
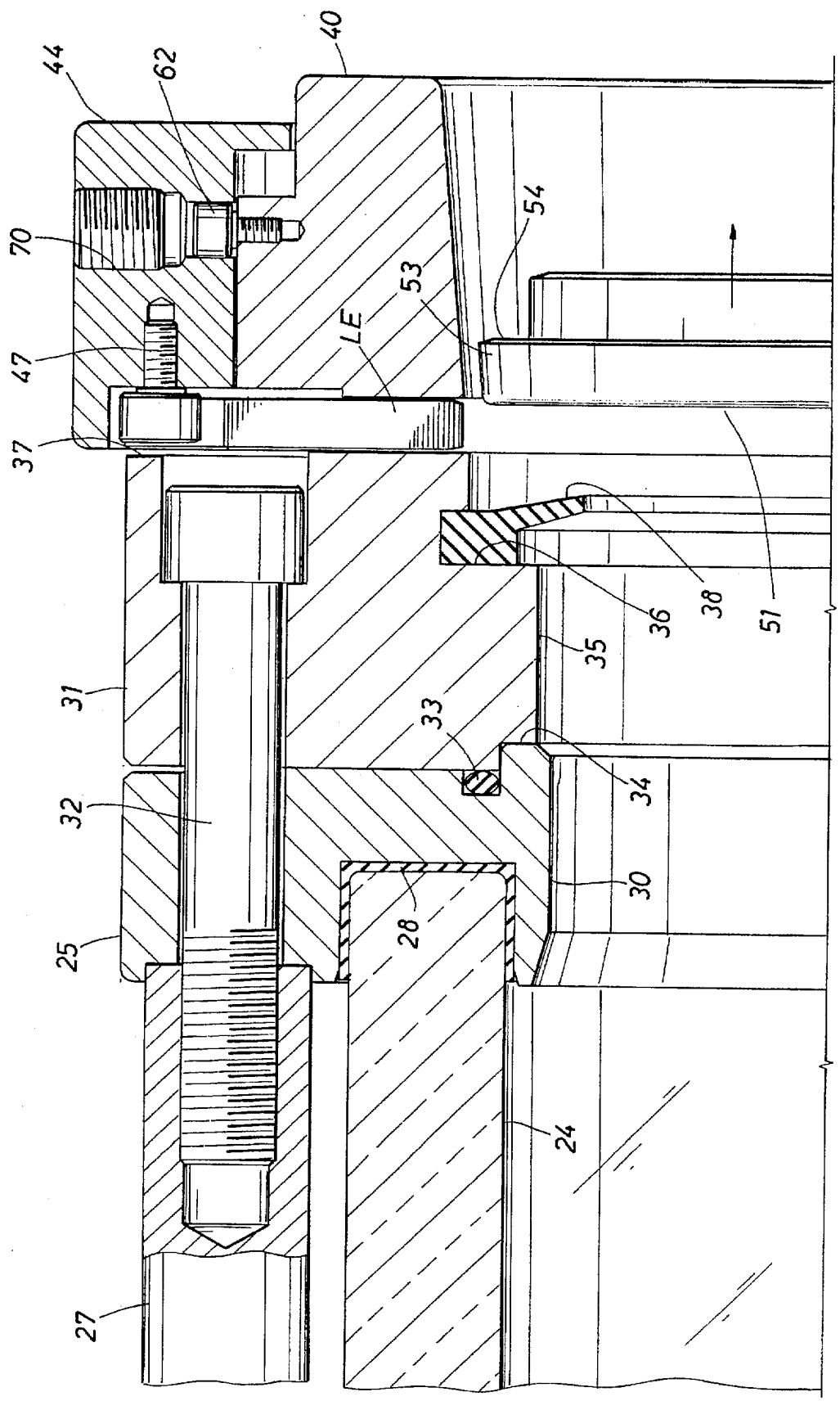
FIG. 4 is a further enlarged longitudinal sectional view of the left-hand of the vessel, as seen along broken line 4—4 of FIG. 2, and with a locking element shown in the unlocking position.
Figure 5:
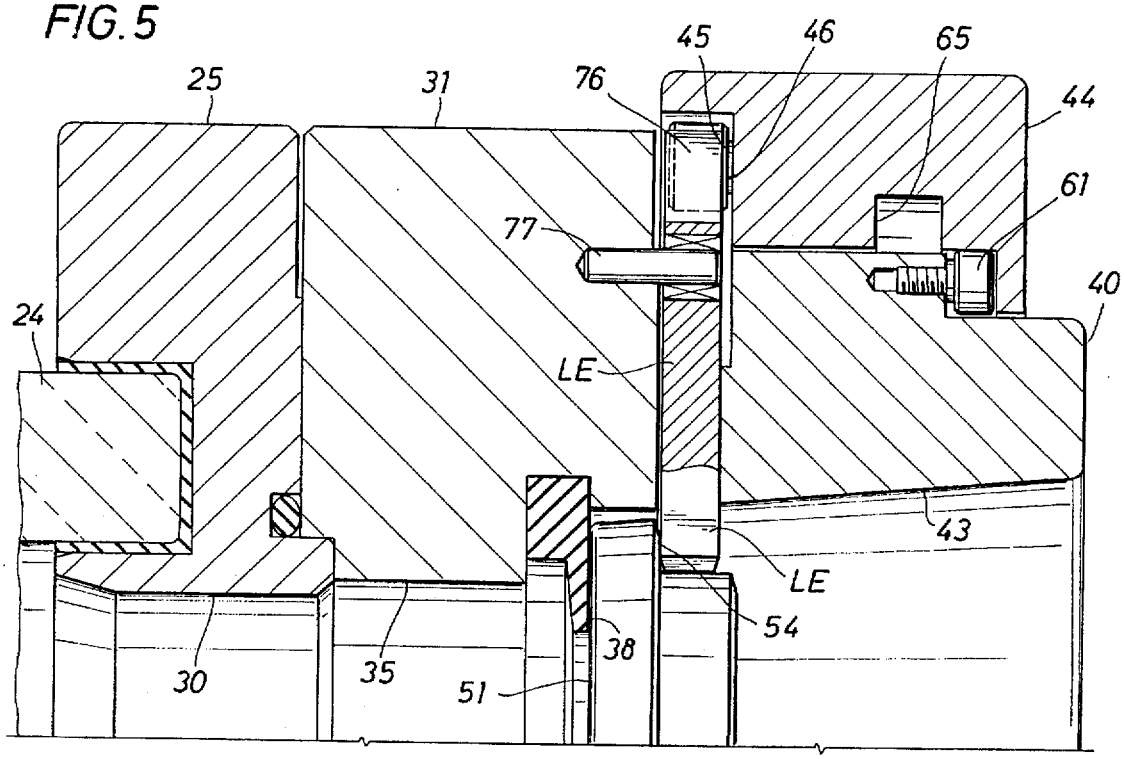
FIG. 5 is a partial view similar to FIG. 4, as seen along broken lines 5—5 of FIG. 2 and with the locking element moved to locking position to hold the door closed.
Figure 6:
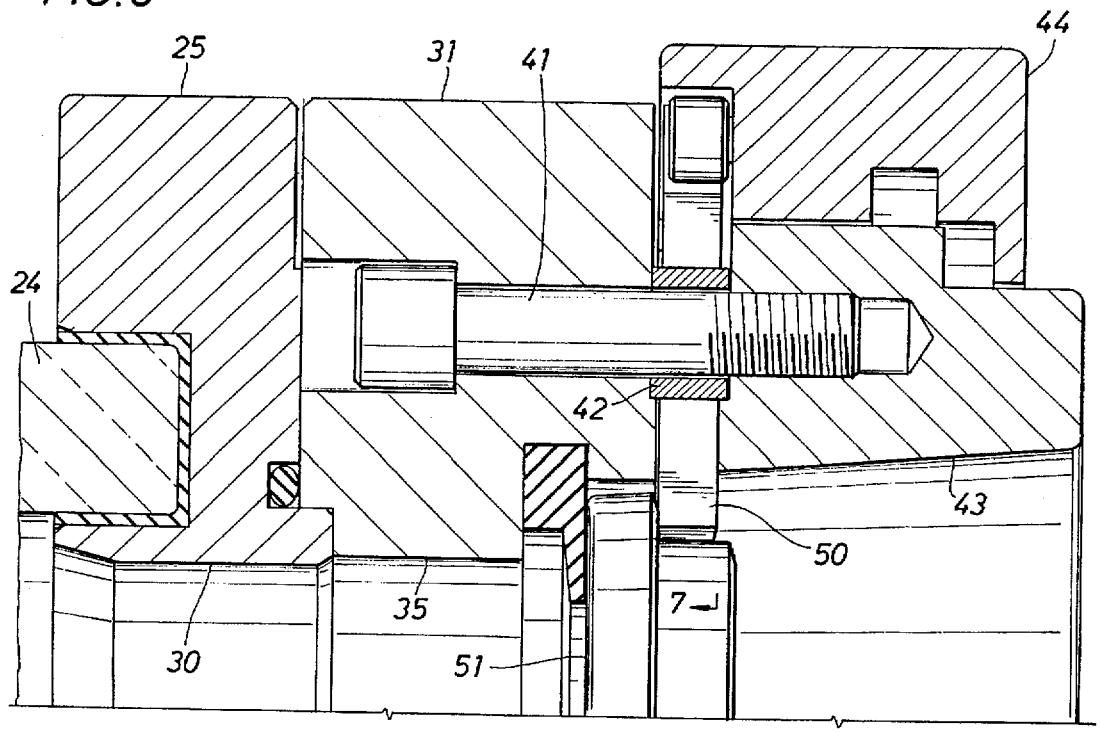
FIG. 6 is another view similar to FIGS. 4 and 5, but as seen along broken lines 6—6 of FIG. 2, and with the locking elements in the locking position of FIG. 5.

A ring 44 surrounds the outer diameter of the carrier ring for rotation thereabout, and has an annular recess 45 on its inner side forming an outer continuation of the space between bodies 31 and carrier ring 40 to receive the outer ends of the locking elements LE as well as to accommodate pins 46 mounted on the carrier ring by means of studs 47 for rotation therewith. As best shown in FIGS. 2, 3, 7 and 8, the pins are arranged in pairs on opposite sides of a finger 76 at the outer end of each locking element, so that, in response to rotation of the ring 44, the locking elements are engaged by the pins and swung between locking positions in which their inner ends opposite the fingers extend inwardly from the annular space in which they are received into opening 43 for disposal against a bearing surface 54 on the outer side of the door body, as shown in FIGS. 5 and 6, and unlocking position in which the inner ends of the locking elements are moved back into the recess to permit the door to be moved into and out of closing position, as shown in FIG. 4. As previously described, in its closed position of FIGS. 5 and 6, the bearing surface 54 on the door body is urged by the higher pressure within the vessel outwardly to tightly engage the oppositely facing inner ends of the locking elements LE.

Rotation of the actuating ring 44 from outside of the chamber is facilitated by means of radial bearings 61 carried by the body 40 and axial bearings 62 carried by the carrier 40. The bearings 61 are received within an annular space formed between the inner side of the ring carrier 40 and an outer reduced diameter of the actuating ring. The axial bearings 62 are received within an annular groove 65 formed in the inner diameter of the actuating ring. The latter bearings of course are installed through access openings 70 formed in the actuating ring to permit their assembly after the ring is in place about the retainer body 40.

As shown in FIGS. 7, 8 and 9, each of the locking elements LE is pivotally mounted on a pin 77 received in the outer side of body 31 to dispose outwardly extending finger 76 at its outer end between a pair of pins 46, and an inner end movable into and out of locking position opposite the bearing surface 54 on the door. When the actuating ring has been rotated to the right, as shown in FIG. 7, the left-hand pin 46 engages the left side of the finger so as to rotate the locking element in a clockwise direction to dispose its inner end close to an outer cylindrical surface on the door adjacent its bearing surface 54. As the locking elements reach this position, the opposite sides of the one locking element are engaged by the pair of pins on opposite sides thereof so as to prevent it from moving beyond closed position. Although, due to tolerances, only one pair of pins may form a stop of this type, it nevertheless, through the rotating ring, will locate all locking elements in their locking positions.

Then, as the locking ring is moved in a counter-clockwise direction, the right-hand pins will engage the right-hand sides of the fingers to swing the locking elements in a counter-clockwise direction and thus out of locking position adjacent the bearing surface on the door. This of course permits the door to be moved to open position or returned to closed position, as desired. As in the case of the locking position of the locking elements, when locking element has moved to the unlocking position of FIG. 8, it is prevented from moving further by engagement of opposite sides of the finger by the pins.

In the alternative construction of the locking element LE' shown in FIG. 9, a shoulder 78 thereon is so located relative to the right side of the finger 76 as to engage the right-hand pin 46 to prevent movement of the locking elements beyond unlocking position, prior to engagement of the left side of the finger with the left hand pin. Upon rotation of the ring and locking element in a counter-clockwise direction, the left hand pin engages the left side of the finger as in the embodiment of FIGS. 7 and 8.

In furtherance of the objects of this invention, the angled configuration of the outer ends of the locking elements permits them to be as close as possible to the inner limit of the bearing surface, the radial extent of the area of the locking elements slidably engagable with the bearing surface against which it is urged by pressure in the chamber is relatively small as compared with their overall radial extent. At the same time, the pins on which the locking elements pivot are located near the fingers on their outer ends to maximize the length of the arm over which a moment is applied by the rotating actuating ring. Additionally, the fingers are disposed in substantially equal angular relation to a radial plane through the pivot pins, in the locked and unlocked position, so as to maximize the force applied by the pins in both directions. Obviously, however, these relationships may vary depending on the rotation desired.

FIG. 10 shows a still further embodiment of the invention, wherein a plurality of locking elements LE' is pivotally mounted in spaced-apart relation on the body 35 of the vessel by means of pins 80. Each such element has a slot 81 in which a pin 82 mounted on the actuating ring 44 is guidably slidable. Thus, as the ring is rotated in opposite directions, its opposite sides bear on opposite sides of the slot to cause the element to swing between locking and unlocking positions. The engagement of one or more of the pins 80 with the outer end of the slot in which it is received may determine the maximum extent of rotation of the element.

As shown, the pins 82 are located near the outer ends of the locking elements, and the locking elements are adapted to form essentially equal angles on opposite sides of a radial plane, when in their locked and unlocked positions.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A pressure chamber comprising
   a vessel having an opening with an inner surface thereabout,
   a door having an outer surface adapted to fit within the inner surface of the vessel to close the opening an outwardly facing bearing surface, and
   means for releasably locking the door in closed position, including
   locking elements each mounted on the vessel for pivoting between locked position in which an inwardly facing side of each is opposite the bearing surface on the door, and thus held thereagainst by pressure in the vessel, and unlocked position removed from opposite said bearing surface so as to permit the door to be installed and/or removed from within the inner surface of the vessel,
   a ring rotatably mounted on the vessel adjacent the opening of the vessel for moving the locking elements between locked and unlocked positions in response to rotation of the ring in opposite directions, and
   means manipulatable from the outside of the vessel for so rotating the ring.

2. As in claim 1, wherein said rotating means comprises
   pins mounted on the vessel and so arranged with respect to oppositely facing surfaces on the locking elements as to swing the locking elements into locked position, as the ring is rotated in one direction, and into unlocked position, as the ring is rotated in the other direction.

3. As in claim 2, wherein
   said pins are arranged in pairs on opposite sides of a locking element so that one pin of at least one pair engages one side of a locking element to swing it into locked position, as the ring is rotated in one direction, and the other pin engages the other side of the locking element to swing it into unlocked position, as the ring is rotated in the other direction.

4. As in claim 3, wherein
   the pins of said one pair are tightly engaged with opposite sides of the locking element in each of its locked and unlocked positions to prevent movement of the locking elements therepast.

5. As in claim 3, wherein
   one side of one pin of said one pair is tightly engaged with one side of the locking element in one of its locked and unlocked positions to prevent movement of the locking elements therepast, and
   each locking element has a shoulder adjacent its other side which is tightly engaged by the other pin, in the other of its positions, to prevent the locking elements from moving therepast.

6. As in claim 2, wherein
   each locking element has a slot in which a pin is received for guidably sliding therein in order to swing the locking element into locked position, as the ring is rotated in one direction, and swing the locking element into unlocked position, as the ring is rotated in the other direction.

7. As in claim 1, wherein
   the vessel includes a body on which the ring is rotatably mounted and an annular seat on the body facing away from its open end, and
   the door has an outer flange with its bearing surface on one side and an inwardly facing surface on its other side to engage the seat.

* * * * *